Figure 1:
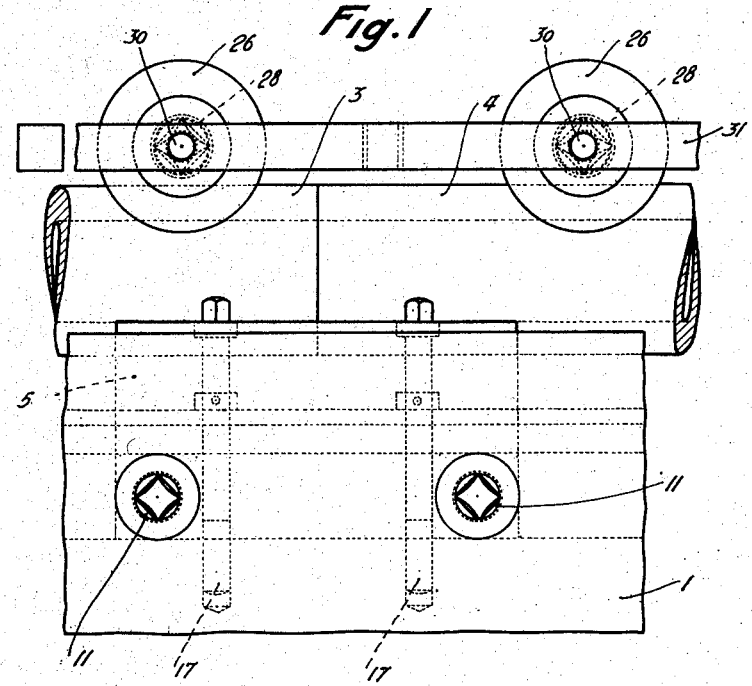

Aug. 15, 1950   M. BARDET   2,519,101
ROLLING TRACK FOR MACHINE-TOOLS
Filed Dec. 13, 1946   2 Sheets-Sheet 1

INVENTOR.
Maurice Bardet
By William C. Luton, Atty.

Aug. 15, 1950     M. BARDET     2,519,101

ROLLING TRACK FOR MACHINE-TOOLS

Filed Dec. 13, 1946     2 Sheets-Sheet 2

INVENTOR.
Maurice Bardet
By William C. Luton
Atty.

Patented Aug. 15, 1950

2,519,101

UNITED STATES PATENT OFFICE 2,519,101

ROLLING TRACK FOR MACHINE TOOLS

Maurice Bardet, Vincennes, France

Application December 13, 1946, Serial No. 715,939
In France September 9, 1946

6 Claims. (Cl. 308—6)

The present invention relates to a highly precise rolling track for machine-tools applicable particularly to surface-grinding machines, cylinder-grinding machines, slabbing millers, and generally speaking, to every machine-tool a part of which is capable of a longitudinal translatory motion upon a frame.

Modern mechanics requires always more precision in machining accuracy, for instance, in the grinding of a plane or cylindrical surface a precision of .003 to .005 millimeter per meter may be necessary, and this cannot be obtained in the finished product unless the machine-tools that have been used for the manufacture thereof have a precision at least equal.

As regards precision machine-tools comprising a table or carriage capable of a translatory movement upon a stationary frame (slide-lathe, table of a grinding or milling-machine etc.), the supports heretofore in general use for the said tables or carriages consisted of plane sliding surfaces, the fine adjustment of which was realized by way of hand-scraping, by specialists who checked the precision of the surfaces with micrometer-rules and levels. Such a hand-scraping method, in which a great many points have to be checked is long, tedious and therefore expensive.

To simplify this work, it has been suggested to apply to such large plane surfaces, some surfaces trued up after planing or milling which have long been in use for surfaces of revolution and for small plane precision surfaces such as those of the so-called Johansson blocks, or liners. However, such sliding plane surfaces made of cast-iron and trued up are operated with a small oil film and have the disadvantage to wear off within a rather short time, to tear off small particles of metal and to cause seizing; moreover, it proves very difficult to realize in this way with the desired precision planes of several meters' length, even in a small width, as is the case with machines comprising a very heavy frame of one solid block (for instance, machines in which the frame weighs approximately six tons, the total length of the track being four meters).

In order to remedy the drawbacks of these sliding plane surfaces, it has also been suggested to utilize, in lieu of a sliding track, a roller track which will also bear upon a plane surface scraped or trued. The wearing previously due to the sliding friction is thus avoided, but the precision aimed at cannot be obtained, either when using cylindrical rollers, or ball bearings: in the first instance the rollers are in their whole width in contact with the flat surfaces of the frame and will reflect every deformation of the same, and errors will also be caused by the particles of dust inserted between the contacting surfaces; as regards ball bearings, there will take place errors due to the bearings themselves.

The subject-matter of the invention is a roller track which remedies the aforesaid defects by using exclusively tempered and trued revolution bearing surfaces with members operated dry (without oil film), no flat supporting surfaces being needed. The invention is essentially characterized in that the two parts of the machine, one of which is movable upon the other, for instance the permanent frame and the movable table or carriage, are both fitted with tempered and trued cylindrical members, of steel, set in a direction parallel with the movement and made with the required precision in separate parts of predetermined lengths; the separate parts may be adjusted separately and laid end to end, in axial alignment, while between each cylindrical support of one part of the machine and the associated support on the other part are inserted a plurality of pairs of conical or frusto conical rollers also tempered and trued, both rollers of each pair being mounted upon an axle which is independent of the two parts of the machine.

To ensure the stability of the supports and their proper resistances to the various forces exerted transversally, a cylindrical bearing member of one part of the machine may be associated with two cylindrical bearing members on the other part, and the conical rollers rolling upon the first cylinder are then divided in two groups also respectively rolling upon the two other cylinders, the axis of each group of rollers being parallel between them whereas the axis of the rollers of the two groups are at a determined angle. The two groups of rollers may alternate, and all axles thereof may be connected together by means of a common longitudinal bar.

Figure 2:
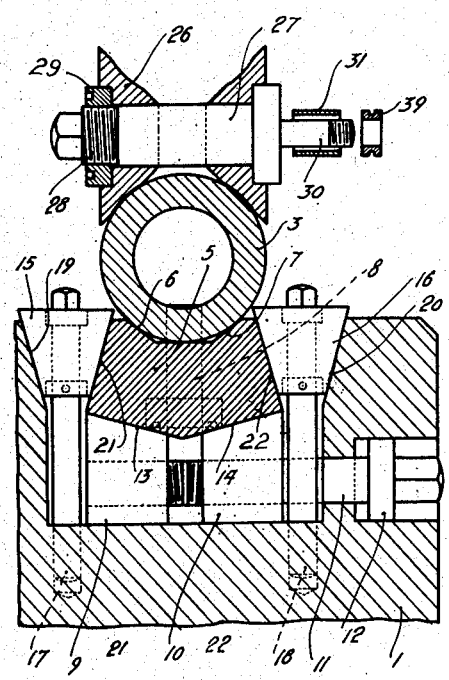
Figure 5:
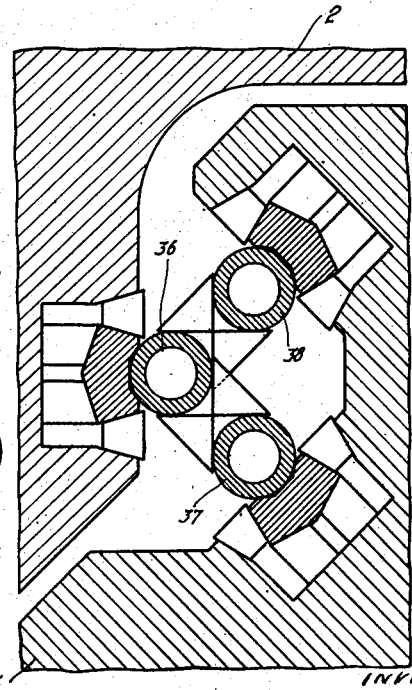
Figure 3:
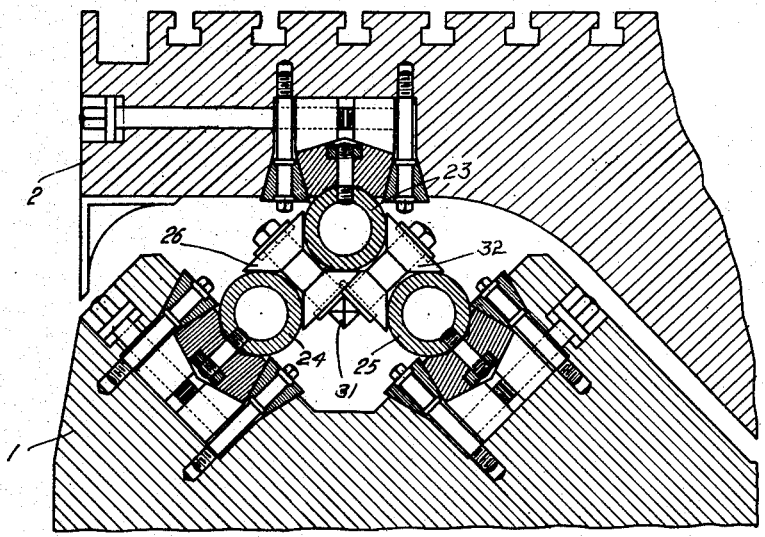
Figure 4:
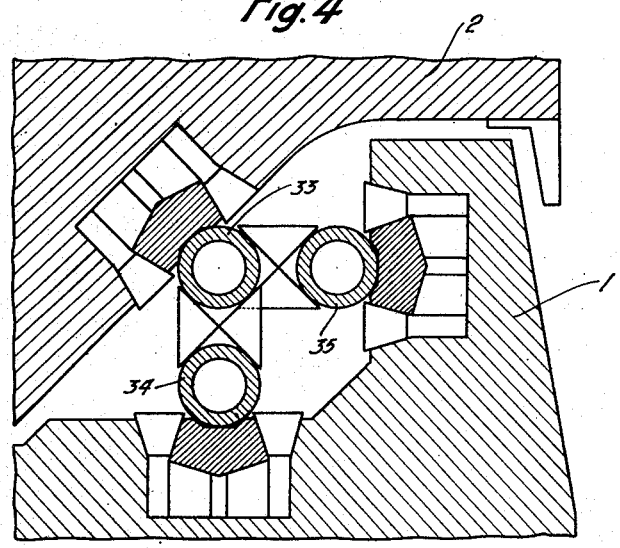
Figure 6:
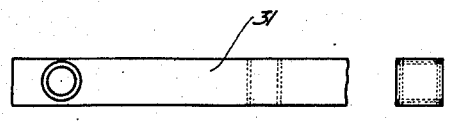

Some constructional forms of the invention will be described thereafter by way of example with reference to the accompanying drawing, in which:

Figures 1 and 2 show in elevation and transverse sectional view respectively, the fitting of the rollers in cooperation with one part of the machine, Figures 3, 4 and 5 show in transverse sectional views, various modifications in the association of the cylindrical support members of one supporting system, Figure 6 is a view of the bar connecting together the axles of rollers of one group of supports.

The drawing shows under reference 1 the stationary frame, and under 2 the movable table of a precision machine-tool such as a grinding-machine.

The cylindrical supporting members are constituted of tempered steel cylinders fitted in a direction parallel to the movement and manufactured in parts positioned end to end in axial alignment; such parts 3 and 4 are shown in Figure 1. By way of example, the measurements of said parts may be one meter in length and eighty millimeters of diameter. Such parts 3 and 4 may be separately adjusted in length and width and for that purpose are bearing, preferably by their ends, upon blocks 5 provided with plane bearing surfaces 6—7 parallel to the cylinders axis in a V-position; one common block will support the adjacent ends of cylinders 3 and 4 positioned end to end and clamped to said block by means of pins or gudgeons 8, not shown in Figure 1 to simplify the drawing. Each block is mounted for instance upon the frame 1 and so arranged as to be adjustable in length and width.

An example of the adjustment device is shown in the drawing. According to this constructional form, the height adjustment is operated by means of wedges 9—10, acting as lifting-jacks, which may be brought nearer or farther each other by actuating a transverse rod or bar 11 provided with two reversed screw-threads which engage respectively the corresponding inner threads of wedges 9 and 10; the rod 11 is provided with a head 12 housed in a recess in the frame 1. The wedges 9 and 10 support the block 5 by means of oblique plane surfaces 13—14 and cause the raising of said block, when said wedges are brought nearer one another by rotating the rod 11 in one way, and the lowering of the same block when the rod 11 is rotated the other way, thus increasing the distance between the wedges. The width adjustment is operated by means of wedges 15—16 actuated by rods 17—18, perpendicular to the rod 11, and screwed inside the frame 1; such wedges operate between the lateral oblique surfaces of the housing thereof in the frame 1 and the lateral oblique surfaces of the block 5 in such a way that by lowering one of the wedges 15—16 and raising the other, the block 5 is moved in the direction of the wedge which has been raised.

As shown in Figure 1, each block 5 may be provided with two groups of wedges 9—10 with two threaded rods 11, and with two groups of wedges 15—16 with two threaded rods 17 and two threaded rods 18. Each threaded rod 11, 17 and 18 may be fitted with a graduated vernier which will permit of easy and precise adjustment.

The process of mounting the cylindrical members may be the same for every one of them, whether they are associated with the frame 1 or the movable table 2; it has been taken for granted in the above description that the height adjustment was operated vertically, this in order to simplify the description with reference to Figures 1 and 2, but it will be understood that, as a point of fact, said adjustment is carried out in accordance with the plane determined by the axis of the two cylinders between which the rollers are inserted, as is clearly shown in Figures 3, 4 and 5.

In the example of Figure 3, a cylinder 23 (or what may be termed more accurately a line or a plurality of cylinders positioned end to end in axial alignment) is associated with the table 2 while two cylinders 24—25 are associated with the frame 1, and all said cylinders may be mounted in the same way as cylinders 3—4 of Figures 1-2.

Between cylinders 23—24 are interposed the pairs of conical rollers 26, tempered and trued. Both rollers 26 of each pair are rotatably mounted upon an axle 27 (Figures 2 and 3) which is provided at one end with a screw-threaded portion 28 engaging the nut 29, thus permitting to bring nearer each other the two conical rollers; the other end of the axle 27 is fitted with an outwardly projecting circular trunnion clamped to a bar 31 which connects the axles of the plurality of conical rollers. Beyond the trunnion 30, the axle 27 is provided with a terminal threaded portion to engage a regulating-nut 29.

Between cylinders 23—25 are interposed in the same way the pairs of conical rollers 32 similar to rollers 26.

The connection bar 31 is common to the two groups of rollers 26—32 and, in the example shown, the axles of rollers 32 are perpendicular with those of rollers 26; the bar 31 has a square cross-section and the afore-mentioned axles are running therethrough in two perpendicular directions. The cylindrical portions forming the rolling track on each side of the table and the frame may be united together at their ends and transversally which will facilitate a correct operation of the rollers. The pairs of rollers 26—32 may alternate, one pair 32 being located between two pairs 26.

In the example of Figure 3, the plane of the axis of cylinders 23—24 and the plane of the axis of cylinders 23—25 are inclined in reverse directions at 45°, which seems to be the best position, in most cases, to resist transverse straining forces. It will be understood that the support arrangement as represented by way of example is for one side of the machine, which will have to be provided with a similar arrangement on the other side.

In the direction of the movement, i. e. lengthwise, if the table has a length 1, the frame may have a double length 2 and the conical roller arrangement will be permitted to occupy a space of 3/2. Thus, when the table is at one end of the frame, the other side of same will exceed the table length by a length 1, while the length of the roller arrangement will only exceed that of the table by a length of 1/2; when the table will be moved towards the other end of the frame, the advance of the rollers will be operated at half-speed and will therefore reach said other end at the same time as the table.

There might be some cases where it would be advisable to have the planes of the cylinders axes in a different relative position, and Figures 4 and 5 show two modifications.

In the case illustrated in Figure 4, one plane of the supporting arrangement, that of cylinders 33—35 is vertical, while the other one, of cylinders 33—35, is horizontal with the object of resisting the transverse straining forces; the cylinder 33 is associated with the movable table 2 and cylinders 34—35 with the frame 1.

In the embodiment shown by Figure 5, more particularly applicable to light machines, both cylinders 37—38 are on the same side of the vertical plane passing by the axis of the cylinder 36 associated to the table 2.

The new roller track and the application thereof to machine-tools will have the following advantages among others:

1. It is possible to build a machine of any required length by manufacturing separate parts which assembling need not be made with an absolute precision, all deformations of the frame and the table being corrected by means of the cylinders, adjustable in length and breadth, 2. By using rollers and cylinders accurately tempered and trued, a perfect precision up to .002 millimeter per meter may be guaranteed, after the rollers and cylinders have been finely adjusted;

3. There is substantially no wear, nor is special care necessary as the rolling motion is operated without lubrication by means of surfaces where there will be not adherence of dust particles, 4. The displacement of the movable part of the machine may be ensured with a very moderate power, 5. The cylinders, axles, rollers, blocks, and wedges acting as lifting-jacks are interchangeable, and it could be considered to have them manufactured in mass production, the costs of handling, transportation and assembling being accordingly greatly reduced.

I claim:

1. A rolling track arrangement for a precision machine-tool of the type having a first part and a second part capable of longitudinal translatory and reciprocatory motion upon said first part comprising trued supporting cylindrical members of tempered steel mounted upon one of said parts of the machine-tool and extending in a direction parallel to the translatory movement thereof, similar supporting cylindrical members mounted upon the other of said parts of said machine-tool, a plurality of pairs of conical rollers of steel, a plurality of transverse axles, independent from said first and second parts, each axle having the two rollers of each of said pairs of rollers rotatably mounted thereon and said rollers being positioned between said cylindrical members of both of said parts for rolling thereon.

2. A rolling track arrangement as claimed in claim 1 wherein a line of cylinders are mounted on said first part, two lines of cylinders are mounted on said second part, said lines of cylinders on both said first and second parts being arranged parallel to the direction of translation of said second part and two groups of pairs of rollers being interposed between said cylindrical members of both parts in such a way that all rollers are capable of rolling upon said line of cylinders mounted on said first part while at the same time each group of pairs of rollers will roll respectively upon one of said two lines of cylinders of said second part.

3. A rolling track arrangement as claimed in claim 1 wherein said supporting cylindrical members are mounted end to end in axial alignment, a plurality of adjustable blocks with V-shaped bearing surfaces are positioned on said parts and each support the ends of two adjacent cylindrical members and means carried by each of said parts for adjusting said blocks in two perpendicular directions both in a transverse plane with respect to the axis of said cylinders.

4. A rolling track arrangement as claimed in claim 1 wherein a line of cylinders are mounted on one part and two lines of cylinders are mounted on the other part, a first series of pairs of rollers rolling upon the line of cylinders of said first part and upon one of the two lines of cylinders of said second part, a second series of pairs of rollers alternating with the pairs of said first series and rolling upon the line of cylinders of said first part and upon the other line of cylinders of said second part, and the axles of all pairs of rollers on one side being connected by means of a longitudinal bar common to the two series of rollers.

5. A rolling track for machine tools comprising in combination a stationary frame, a carriage reciprocable therealong, a plurality of lines of sectional cylindrical supporting members extending in a direction parallel with the movement of said carriage and arranged between said stationary frame and said carriage, adjustable blocks mounted within said stationary frame and said carriage and supporting said lines of sectional cylindrical members thereon whereby each line may be separately adjustable laterally upon adjustment of said blocks, a plurality of floating axles, a pair of conical rollers rotatably mounted upon each of said floating axles and said conical rollers riding directly upon said lines of sectional cylindrical supporting members.

6. A rolling track arrangement as claimed in claim 1 comprising a longitudinal bar supporting said axles of said rollers.

MAURICE BARDET.

REFERENCES CITED

The following references are of record in the file of this patent:

UNITED STATES PATENTS

| Number | Name | Date |
|---|---|---|
| 2,049,394 | Johnson | July 28, 1936 |
| 2,083,682 | Balsiger et al. | June 15, 1937 |
| 2,104,299 | Grundstein | Jan. 4, 1938 |
| 2,171,854 | Lee | Sept. 5, 1939 |
| 2,173,587 | Huffman | Sept. 19, 1939 |